United States Patent
Chu (10) Patent No.: US 11,989,940 B2
(45) Date of Patent: May 21, 2024

(54) MOVIE DETECTION SYSTEM AND MOVIE DETECTION METHOD

(71) Applicant: REALTEK SEMICONDUCTOR CORP., Hsinchu (TW)

(72) Inventor: Yen-Hsun Chu, Hsinchu (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 412 days.

(21) Appl. No.: 17/551,355

(22) Filed: Dec. 15, 2021

(65) Prior Publication Data
US 2022/0292824 A1 Sep. 15, 2022

(30) Foreign Application Priority Data
Mar. 12, 2021 (TW) ................................ 110108955

(51) Int. Cl.
| | |
|---|---|
| *G06V 20/40* | (2022.01) |
| *G06N 3/08* | (2023.01) |
| *G06T 3/40* | (2006.01) |
| *G06V 10/26* | (2022.01) |
| *G06V 10/776* | (2022.01) |
| *G06V 10/82* | (2022.01) |

(52) U.S. Cl.
CPC ............... *G06V 20/41* (2022.01); *G06N 3/08* (2013.01); *G06T 3/40* (2013.01); *G06V 10/26* (2022.01); *G06V 10/776* (2022.01); *G06V 10/82* (2022.01); *G06V 20/49* (2022.01)

(58) Field of Classification Search
None
See application file for complete search history.

(56) References Cited

U.S. PATENT DOCUMENTS

2020/0160096 A1* 5/2020 Lee .................. G06V 10/82

FOREIGN PATENT DOCUMENTS

| CN | 101841643 A | 9/2010 |
|---|---|---|
| CN | 105959686 A | 9/2016 |
| CN | 106484837 A | 3/2017 |

* cited by examiner

*Primary Examiner* — Leon Flores
(74) *Attorney, Agent, or Firm* — Li & Cai Intellectual Property (USA) Office (57) ABSTRACT

A movie detection system and a movie detection method are provided. The method includes: capturing a current image of an input video source; performing a pre-processing process and an image scaling on the current image, cutting and retaining a top and a bottom of the current image, and joining the top and bottom to generate a joined current image; inputting the joined current image into a trained machine learning model to classify the joined current image as a movie image or a non-movie image. The trained machine learning model is generated by performing a training process on a machine learning model, and the training process is performed based on a plurality of joined training images. The joined training images are generated by performing the pre-processing process on a plurality of movie images with black bars and a plurality of non-movie images without black bars.

14 Claims, 5 Drawing Sheets

MOVIE DETECTION SYSTEM AND MOVIE DETECTION METHOD

CROSS-REFERENCE TO RELATED PATENT APPLICATION

This application claims the benefit of priority to Taiwan Patent Application No. 110108955, filed on Mar. 12, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a detection system and a detection method, and more particularly to a movie detection system and a movie detection method.

BACKGROUND OF THE DISCLOSURE

As people hold higher requirements for viewing quality of movies, when playing movies, existing multimedia products often adjust videos or audios of the movies to enhance a viewing experience of a user, and the user can even feel the difference between movie videos and non-movie videos when watching movies. In other words, it is necessary to detect and distinguish between movie video sources and non-movie video sources.

However, due to increases in resolutions of displays, resolutions of the video sources are increased. Therefore, costs required to obtain images and analyze the images by capturing high-resolution video sources are also increased. In addition to increasing demands on computing resources, time required to analyze high-resolution video also becomes longer.

Therefore, there is a need for a detection system and a detection method that can reduce the cost of analyzing images.

SUMMARY OF THE DISCLOSURE

In response to the above-referenced technical inadequacies, the present disclosure provides a movie detection system and a movie detection method.

In one aspect, the present disclosure provides a movie detection method that includes: configuring an electronic device to play an input video source; configuring a processor of the electronic device to capture a current image of the input video source and store the current image in a memory, in which the current image has a first image scale; performing a pre-processing process on the current image, in which the pre-processing process includes configuring the processor to: perform an image scaling process on the current image to generate a zoomed current image having a second image scale, in which the second image scale is smaller than the first image scale; perform a cutting process on the zoomed current image, and only retain a top and a bottom of the zoomed current image; and join the top and the bottom to generate a joined current image; and configuring the processor to input the joined current image into a trained machine learning model to classify the joined current image as a movie image or a non-movie image. The trained machine learning model is generated by performing a training process on a machine learning model, and the training process is performed based on a plurality of joined training images, the plurality of joined training images are generated by performing the pre-processing process on a plurality of movie images with black bars and a plurality of non-movie images without black bars, and the plurality of joined training images are respectively marked as the movie images and the non-movie images to be used as expected outputs of the machine learning model in the training process.

In another aspect, the present disclosure provides a movie detection system, which includes an input video source and an electronic device. The electronic device is configured to receive and play the input video source, and the electronic device includes a memory and a processor. The memory stores a trained machine learning model. The processor is configured to capture a current image of the input video source and store the current image in the memory, and the current image has a first image scale. The processor is configured to perform a pre-processing process on the current image, and the pre-processing process includes: performing an image scaling process on the current image to generate a zoomed current image having a second image scale, wherein the second image scale is smaller than the first image scale; performing a cutting process on the zoomed current image, and only retain a top and a bottom of the zoomed current image; and joining the top and the bottom to generate a joined current image. The processor is configured to input the joined image into a trained machine learning model to classify the joined current image as a movie image or a non-movie image. The trained machine learning model is generated by performing a training process on a machine learning model, and the training process is performed based on a plurality of joined training images. The plurality of joined training images are generated by performing the pre-processing process on a plurality of movie images with black bars and a plurality of non-movie images without black bars, and the plurality of joined training images are respectively marked as movie images and non-movie images to be used as expected outputs of the machine learning model in the training process.

Therefore, the movie detection system and the movie detection method provided by the present disclosure are based on the black bars generated by a unique ratio of movie images when playing the movie, pre-process the input images to obtain specific features for judgments, and train the machine learning model based on the black bars. Since the image size required for the judgment is greatly reduced, a light-weighted deep learning model can be used to greatly reduce computing costs and time required.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
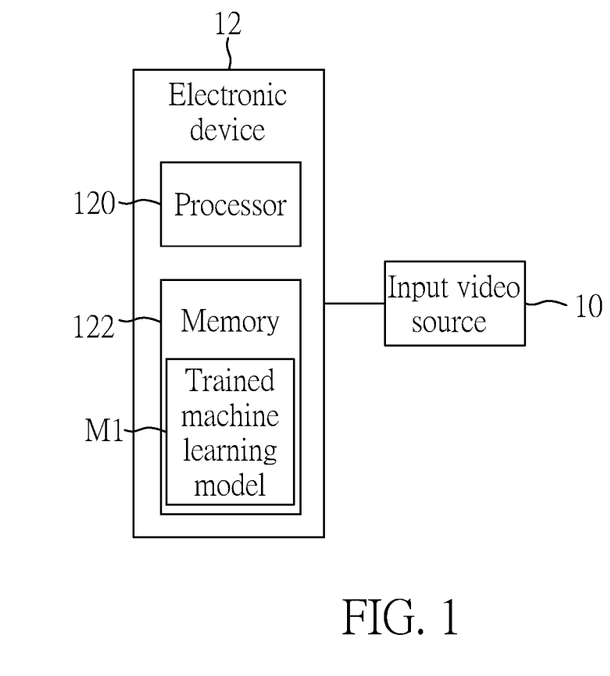
FIG. 1 is a functional block diagram of a movie detection system according to an embodiment of the present disclosure.

FIG. 1 is a functional block diagram of a movie detection system according to an embodiment of the present disclosure.

Reference is made to FIG. 1, a first embodiment of the present disclosure provides a movie detection system 1, which includes an input video source 10 and an electronic device 12.

The electronic device 12 is, for example, a desktop computer, a laptop computer, a smart phone, a tablet computer, a game console, an e-book, a set-top box, or a smart TV, etc., and is configured to receive and play the input video source 10, and the electronic device 12 includes a processor 120 and a memory 122. The electronic device 12 can have a display, such as a liquid crystal display (LCD), a light-emitting diode (LED) display, a field emission display (FED), or an organic light-emitting diode (OLED) or other types of displays.

The input video source 10 can be a file source in the electronic device 12 or an independent electronic device.

The input video source 10 can provide multimedia data, for example, the input video source 10 can be a video locally provided by the electronic device 12. In some embodiments, the input video source 10 can be streaming data transmitted based on protocols such as user datagram protocol (UDP), transmission control protocol (TCP), or real time streaming protocol (RTSP), but the present disclosure is not limited thereto.

The memory 122 can be configured to store images, program codes, software modules, and other data. It can be, for example, any type of fixed or removable random access memory (RAM), read-only memory (ROM), flash memory, hard disks or other similar devices, integrated circuits and combinations thereof. In this embodiment, the memory 122 stores a trained machine learning model M1.

The processor 120 is, for example, a central processing unit (CPU), or other programmable general-purpose or special-purpose microprocessor, digital signal processor (DSP), programmable controllers, application-specific integrated circuits (ASIC), a programmable logic device (PLD), a graphics processing unit (GPU), other similar devices, or a combination of these devices. The processor 120 can execute program codes, software modules, instructions, and the like that are recorded in the memory 122 to implement the movie detection method of the embodiment of the present disclosure.

In addition, the electronic device 12 can include a hardware decoding circuit to perform video decoding operations based on hardware. In some embodiments, the hardware decoding circuit can be implemented by at least one image/audio processing engine circuit, at least one display chip, at least one audio processing chip, and/or at least one ASIC. The aforementioned hardware decoding circuit can be included in the processor 120.

Figure 2:
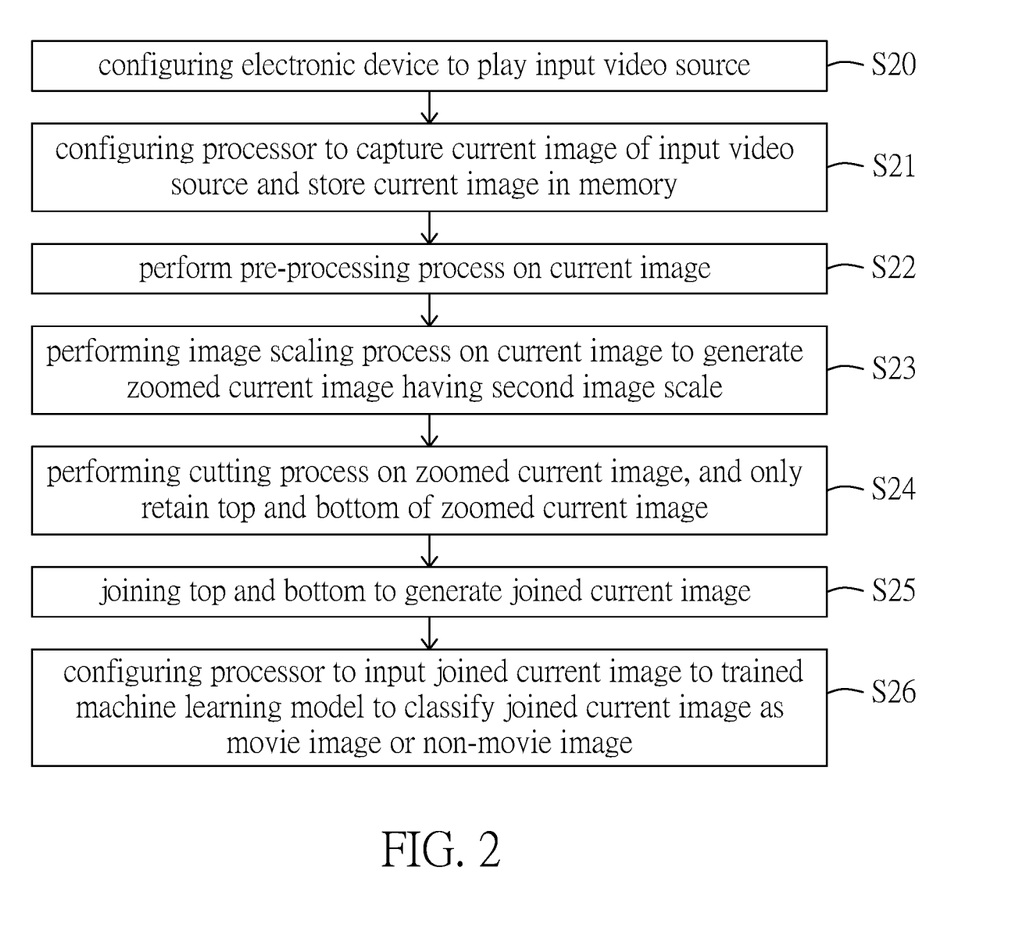
FIG. 2 is a flowchart of a movie detection method according to an embodiment of the present disclosure.

FIG. 2 is a flowchart of a movie detection method according to an embodiment of the present disclosure. Reference is made to FIG. 2, and the movie detection method mentioned in this embodiment is applicable to the movie detection system 1 in the above embodiment. The following is a description of the detailed steps of the movie detection method of this embodiment in conjunction with the components in the movie detection system 1.

Step S20: configuring the electronic device 12 to play the input video source.

Step S21: configuring the processor 120 of the electronic device 12 to capture a current image of the input video source and store the current image in the memory 122. The current image has a first image scale.

In general, current standard specifications of movie images usually have an aspect ratio of 2.39:1 or 1.85:1. However, aspect ratios of most of the existing displays that support 4K, 2K, 1080P and 720P specifications are 16:9 or 16:10, which will inevitably lead to black bars on the upper and lower sides of movies when movies are played, therefore, the black bars can be used to distinguish movie images from non-movie images.

Figure 3A:
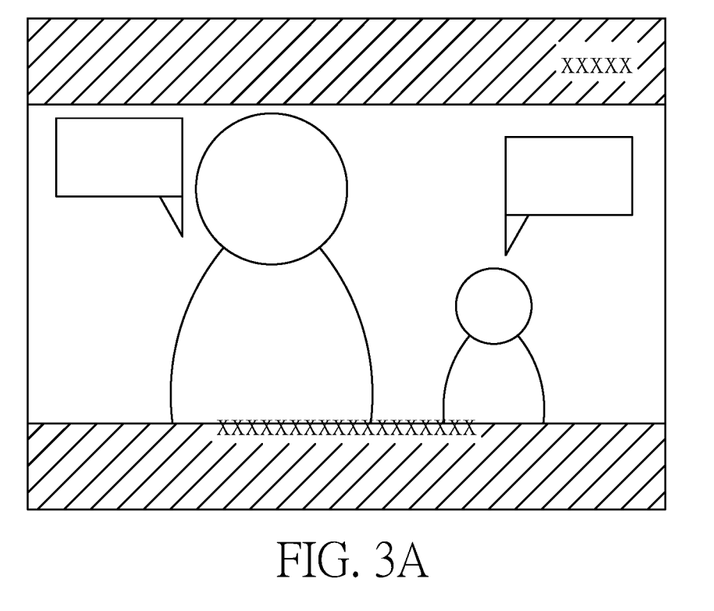
FIGS. 3A to 3C are schematic diagrams showing a pre-processing process according to an embodiment of the present disclosure.
Figure 3B:
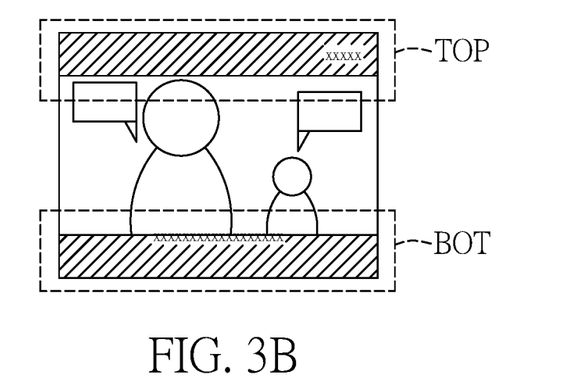
Figure 3C:
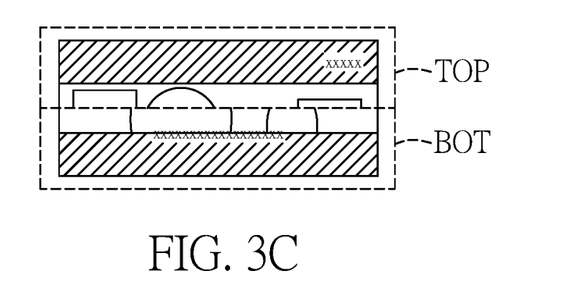

The movie detection method further includes configuring the processor 12 to: Step S22: perform the pre-processing process on the current image. Reference can be made to FIGS. 3A to 3C. FIGS. 3A to 3C are schematic diagrams showing the pre-processing process according to an embodiment of the present disclosure. The pre-processing process includes configuring the processor 120 to perform the following steps:

Step S23: performing an image scaling process on the current image to generate a zoomed current image having a second image scale. For example, the image scaling process includes a nearest neighbor interpolation, a bilinear interpolation method, a bicubic interpolation method, and a bitmap scaling algorithm, as shown in FIGS. 3A to 3B.

On the other hand, the second image scale is smaller than the first image scale. For example, the first image scale includes 4K, 2K, 1080P, and 720P, and the second image scale can be smaller than 1/16 of the first image scale. In this step, the current image can be scaled to the second image scale of 320*180 by using the bilinear interpolation. Although this manner loses the details in the current image, the movie detection method of the present disclosure focuses on the black bars on the upper and lower sides of the current image, therefore, an impact of losing image details is negligible.

Step S24: performing a cutting process on the zoomed current image, and only retain a top TOP and a bottom BOT of the zoomed current image. As shown in FIGS. 3B to 3C, only the top TOP and the bottom BOT of the zoomed current image are retained.

Step S25: joining the top TOP and the bottom BOT to generate a joined current image, as shown in FIG. 3C.

Step S26: configuring the processor 120 to input the joined current image to the trained machine learning model to classify the joined current image as a movie image or a non-movie image.

Figure 4:
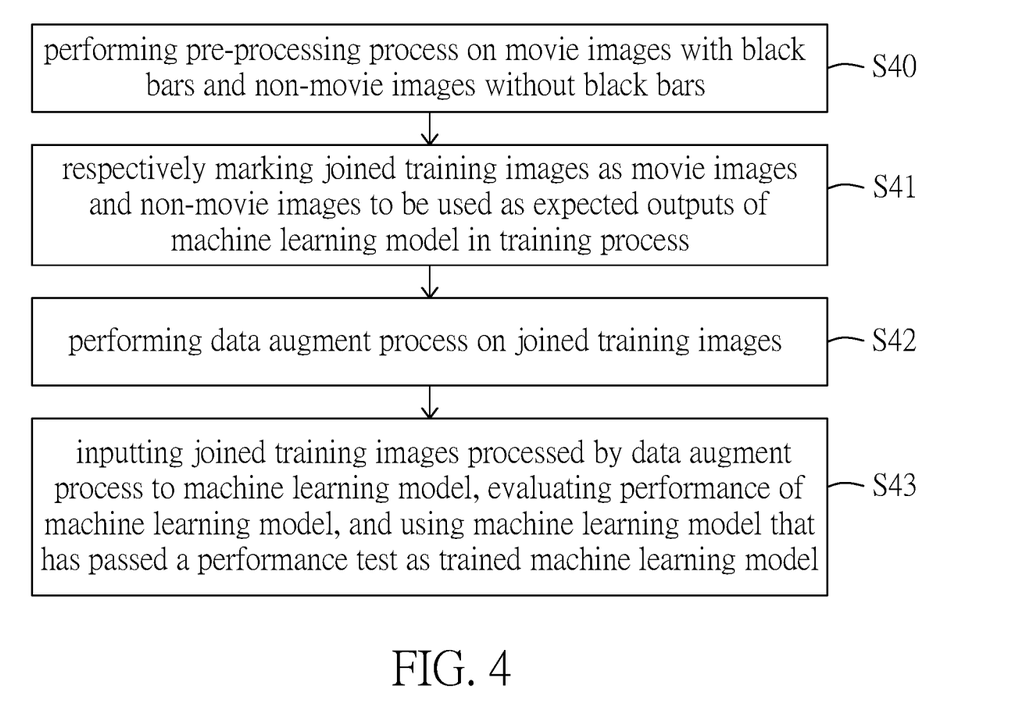
FIG. 4 is a flowchart of a training process according to an embodiment of the present disclosure.

In the above steps, the trained machine learning model is generated by performing a training process on a machine learning model. Reference is made to FIG. 4, which is a flowchart of a training process according to an embodiment of the present disclosure. The training process is performed based on a plurality of joined training images and includes the following steps:

Step S40: performing the pre-processing process on a plurality of movie images with black bars and a plurality of non-movie images without black bars. Similarly, the plurality of movie images with black bars and the plurality of non-movie images without black bars can be scaled to the second image scale of 320*180 by using the bilinear interpolation, and then cut and joined to obtain the plurality of joined training images.

Step S41: respectively marking the plurality of joined training images as movie images and non-movie images to be used as expected outputs of the machine learning model in the training process.

Step S42: performing a data augment process on the plurality of joined training images. In this step, the data augment process is to randomly adjust RGB values of the plurality of joined training images within a predetermined range.

In detail, since different set-top boxes or video sources have different performances on RGB values of the black bars, this step can perform random brightness adjustment on the joined training images to randomly increase the RGB values by about 10 to 20, such that a training data is closer to a real usage.

Reference is made to Table I, which is the training data set used in the above training process, and the training data set is divided into a training set and a test set:

TABLE I

|  | Image size | Aspect ratio | Training set | Test set |
| --- | --- | --- | --- | --- |
| Movie image | 4K, 2K, 1280*720 | 2.39:1 1.85:1 | Total 69646 images | Total 7628 images |

TABLE I-continued

|  | Image size | Aspect ratio | Training set | Test set |
| --- | --- | --- | --- | --- |
| Non-movie image | 4K, 2K, 1280*720 | None | Total 86895 images | Total 9221 images |

Step S43: inputting the plurality of joined training images processed by the data augment process to the machine learning model, evaluating performance of the machine learning model, and using the machine learning model that has passed a performance test as the trained machine learning model.

In the above embodiment, the machine learning model can be, for example, a convolutional neural network. Further reference can be made to FIG. 5, which is a schematic diagram illustrating an architecture of a convolutional neural network according to an embodiment of the present disclosure.

Figure 5:
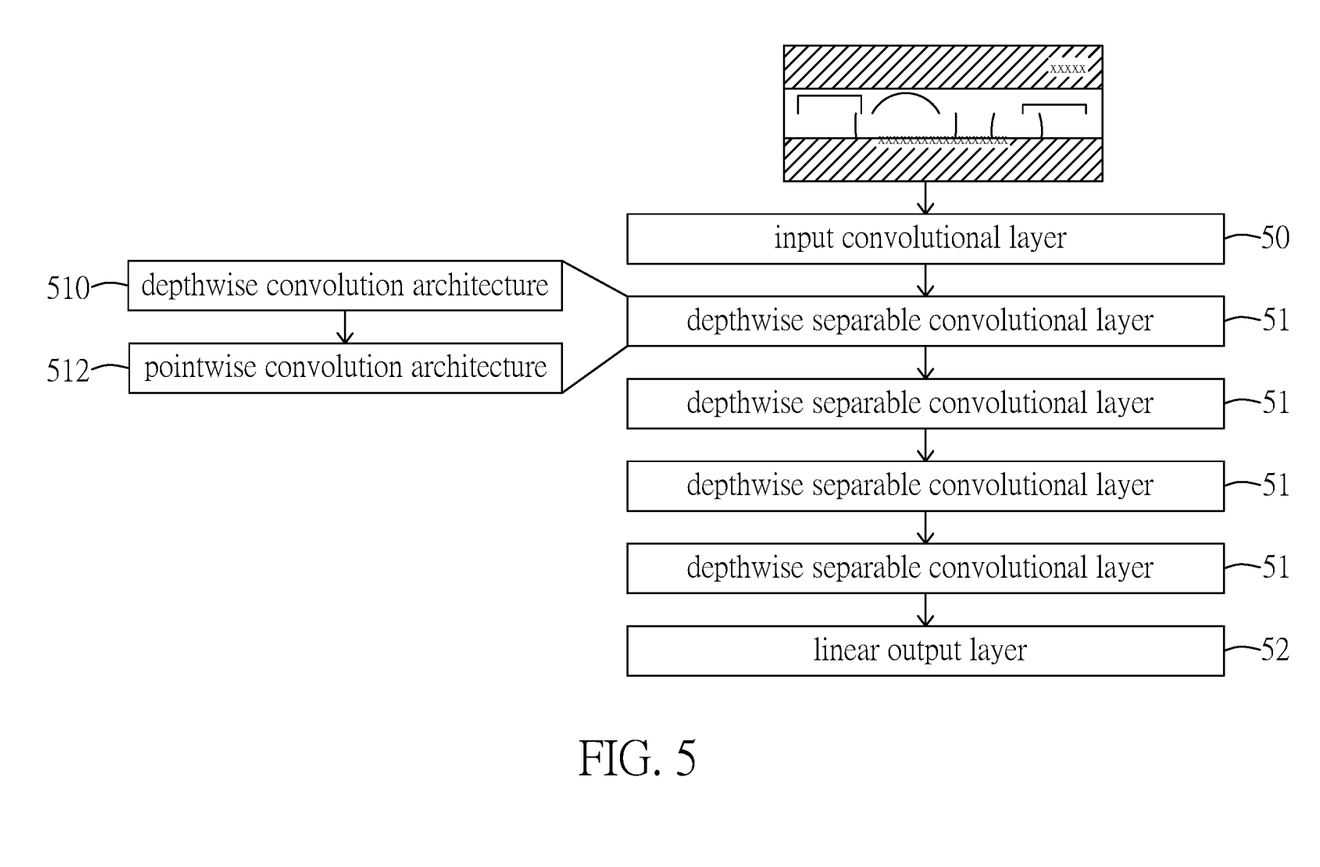
FIG. 5 is a schematic diagram illustrating an architecture of a convolutional neural network according to an embodiment of the present disclosure.

As shown in FIG. 5, the convolutional neural network includes an input convolutional layer 50, a plurality of depthwise separable convolutional layers 51, and a linear output layer 52.

The input convolutional layer 50 can be, for example, a 2-dimensional convolutional layer. Each of the plurality of depthwise separable convolutional layers 51 includes a depthwise convolution architecture 510 and a pointwise convolution architecture 512.

In detail, the depthwise separable convolutional layer 51 comes from MobileNet, a high-efficiency network for mobile and embedded visual applications. Compared to networks using a same depth for regular/standard convolution calculations, MobileNet uses hybrid depthwise convolution and a large number of 1*1*M pointwise convolutions to achieve a significant effect of reducing convolutional computing loading, thereby achieving a light-weighted depth neural network.

Therefore, the movie detection system and the movie detection method provided by the present disclosure are based on the black bars generated by a unique ratio of movie images when playing the movie, pre-process the input images to obtain specific features for judgments, and train the machine learning model based on the black bars. Since the image size required for the judgment is greatly reduced, a light-weighted deep learning model can be used to greatly reduce computing costs and time required.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A movie detection method, comprising:

configuring an electronic device to play an input video source;

configuring a processor of the electronic device to capture a current image of the input video source and store the current image in a memory, wherein the current image has a first image scale;

performing a pre-processing process on the current image, wherein the pre-processing process includes configuring the processor to:

perform an image scaling process on the current image to generate a zoomed current image having a second image scale, wherein the second image scale is smaller than the first image scale;

perform a cutting process on the zoomed current image, and only retain a top and a bottom of the zoomed current image; and join the top and the bottom to generate a joined current image; and configuring the processor to input the joined current image into a trained machine learning model to classify the joined current image as a movie image or a non-movie image, wherein the trained machine learning model is generated by performing a training process on a machine learning model, and the training process is performed based on a plurality of joined training images, wherein the plurality of joined training images are generated by performing the pre-processing process on a plurality of movie images with black bars and a plurality of non-movie images without black bars, and the plurality of joined training images are respectively marked as the movie images and the non-movie images to be used as expected outputs of the machine learning model in the training process.

2. The movie detection method according to claim 1, wherein the training process further includes:

performing a data augment process on the plurality of joined training images; and inputting the plurality of joined training images processed by the data augment process to the machine learning model, evaluating performance of the machine learning model, and using the machine learning model that has passed a performance test as the trained machine learning model.

3. The movie detection method according to claim 2, wherein the data augment process includes randomly adjusting RGB values of the plurality of joined training images within a predetermined range.

4. The movie detection method according to claim 1, wherein the first image scale includes 4K, 2K, 1080P, and 720P, and the second image scale is smaller than 1/16 of the first image scale.

5. The movie detection method according to claim 1, wherein the image scaling process includes a nearest neighbor interpolation, a bilinear interpolation, a bicubic interpolation, and a bitmap scaling algorithm.

6. The movie detection method according to claim 1, wherein the machine learning model is a convolutional neural network.

7. The movie detection method according to claim 6, wherein the convolutional neural network includes:

an input convolutional layer;

a plurality of depthwise separable convolutional layers; and a linear output layer, wherein the plurality of depthwise separable convolutional layers each include a depthwise convolution architecture and a pointwise convolution architecture.

8. A movie detection system, comprising:

an input video source; and an electronic device configured to receive and play the input video source, wherein the electronic device includes:

a memory storing a trained machine learning model; and a processor configured to capture a current image of the input video source and store the current image in the memory, wherein the current image has a first image scale, wherein the processor is configured to perform a pre-processing process on the current image, and the pre-processing process includes:

performing an image scaling process on the current image to generate a zoomed current image having a second image scale, wherein the second image scale is smaller than the first image scale;

performing a cutting process on the zoomed current image, and only retaining a top and a bottom of the zoomed current image; and joining the top and the bottom to generate a joined current image; and wherein the processor is configured to input the joined current image into a trained machine learning model to classify the joined current image as a movie image or a non-movie image, wherein the trained machine learning model is generated by performing a training process on a machine learning model, and the training process is performed based on a plurality of joined training images, wherein the plurality of joined training images are generated by performing the pre-processing process on a plurality of movie images with black bars and a plurality of non-movie images without black bars, and the plurality of joined training images are respectively marked as the movie images and the non-movie images to be used as expected outputs of the machine learning model in the training process.

9. The movie detection system according to claim 8, wherein the training process further includes:

performing a data augment process on the plurality of joined training images; and inputting the plurality of joined training images processed by the data augment to the machine learning model, evaluating performance of the machine learning model, and using the machine learning model that has passed a performance test as the trained machine learning model.

10. The movie detection system according to claim 9, wherein the data augment process includes randomly adjusting the RGB values of the joined training images within a predetermined range.

11. The movie detection system according to claim 8, wherein the first image scale includes 4K, 2K, 1080P, and 720P, and the second image scale is smaller than 1/16 of the first image scale.

12. The movie detection system according to claim 8, wherein the image scaling process includes a nearest neighbor interpolation, a bilinear interpolation method, a bicubic interpolation method, and a bitmap scaling algorithm.

13. The movie detection system according to claim 8, wherein the machine learning model is a convolutional neural network.

14. The movie detection system according to claim 13, wherein the convolutional neural network includes:
   an input convolutional layer;
   a plurality of depthwise separable convolutional layers; and
   a linear output layer,
   wherein the plurality of depthwise separable convolutional layers each include a depthwise convolution architecture and a pointwise convolution architecture.

* * * * *